No. 12,096. REISSUED MAR. 10, 1903.

T. H. MACDONALD.

SOUND RECORD.

APPLICATION FILED JAN. 22, 1903.

Witnesses

Geo. Imrie

Wm. B. Kerkam

Inventor

Thomas H. Macdonald

By Maurd. Cameron & Lance

Attorneys

UNITED STATES PATENT OFFICE.

THOMAS H. MACDONALD, OF BRIDGEPORT, CONNECTICUT, ASSIGNOR TO THE AMERICAN GRAPHOPHONE COMPANY, OF WASHINGTON, DISTRICT OF COLUMBIA.

SOUND-RECORD.

SPECIFICATION forming part of Reissued Letters Patent No. 12,096, dated March 10, 1903.

Original application filed November 3, 1900, Serial No. 35,351. Divided and application filed May 21, 1901, Serial No. 61,267. Patented September 17, 1901, No. 682,992. Application for reissue filed January 22, 1903. Serial No. 140,124

*To all whom it may concern:*

Be it known that I, THOMAS H. MACDONALD, a resident of Bridgeport, Connecticut, have invented a new and useful Improvement in Sound-Records, which invention is fully set forth in the following specification.

This invention relates to an improvement in sound-records; and it consists in the improved record itself, this application being a division of my application, filed November 3, 1900, Serial No. 35,351.

In order to explain my invention more readily, I refer to the annexed drawings, which show one form of apparatus for carrying out my process.

Figure 2:
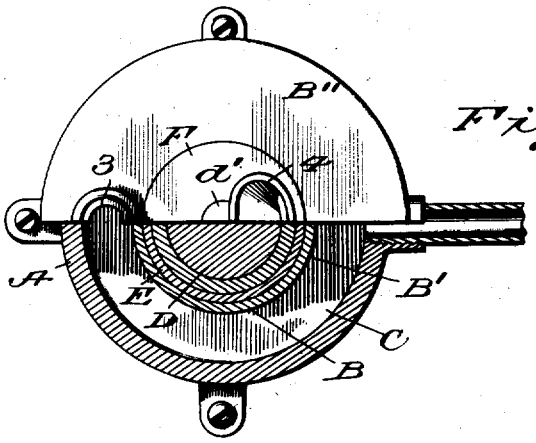
Figure 1:
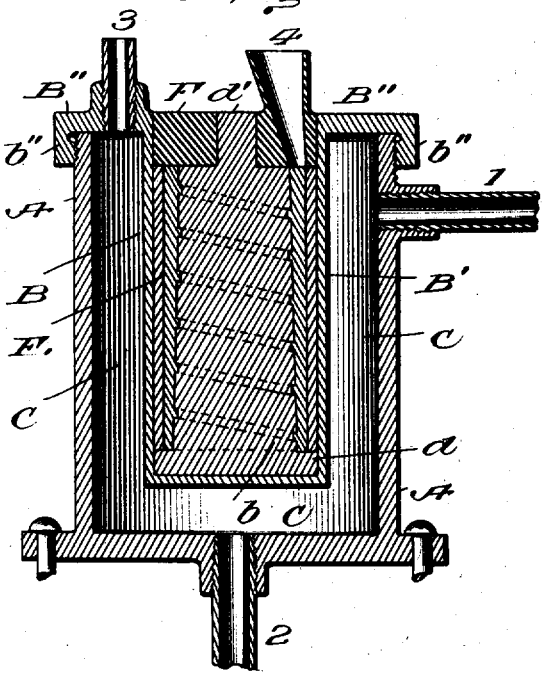
Figure 3:
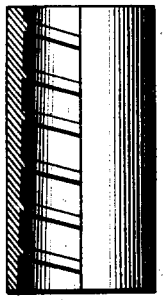

Figure 1 is a vertical sectional view, and Fig. 2 a plan partly broken away. Fig. 3 is intended to illustrate the improved sound-record.

The record is cast into a suitable mold which is surrounded by a steam and water jacket for superheating and cooling the casting. This jacket consists of an outer shell A and an inner shell B for the mold, these shells inclosing between them the steam-tight space C. Shell A is closed at the bottom and open at the top for receiving shell B and is provided with valve-controlled inlets 1 and 2 for steam and cold water, respectively. Shell B consists of a hollow cylinder B′, also closed at the bottom *b* and open at the top and has an annular flange B″, that rests upon the top of shell A and is secured thereto, as by screw-threaded lip *b*″. Flange B″ constitutes the cover of the inclosed space C and serves to suspend shell B therein and is provided with the valve-controlled outlet 3. Core D has the base *d* fitting snugly in shell B′ and resting on bottom *b* and at its upper end carries the stem *d*′. A suitable matrix E is fitted snugly into shell B to rest upon base *d*. A head F is inserted in the top of shell B and rests squarely upon the top of matrix E and core D, stems *d*′ taking into a suitable opening in the head, which thus assists in securing the core in proper position. The annular space between the matrix and the core (constituting the mold) is thus inclosed by the base *d* and the head F. The head is provided with the funnel 4, forming an inlet for pouring into the mold the melted material that is to form the improved sound-record.

In carrying out my invention I proceed as follows: I fill the mold (through funnel 4) with the melted material, (soap mixture or the like,) which is hereinafter for convenience designated "wax," though I do not limit myself to a wax-like composition, since any suitable material or composition that can be readily handled may be employed and will come within the scope of my invention. I then admit steam through inlet 1 into the space C and heat the mold and its contents up to, say, about 350° Fahrenheit and maintain the heat for some time, preferably until the entire mass of the wax is in a limpid state. This superheating forces the melted wax into a more intimate relation with the matrix and expels all air-bubbles from the mass of the wax and from the minute spaces in and around the irregularities in the matrix-surface, thus producing a more intimate contact between the molten wax and the matrix. After maintaining this heat for a length of time sufficient to drive off all bubbles and impurities I then admit cold water through inlet 2 and allow the steam to escape through outlet 3. This sudden application of cold chills the surface of the wax instantly and symmetrically and causes it to contract from the matrix-surface sufficiently to clear the now-solidified casting from the matrix and permit its withdrawal. The fact that the cold acts evenly from all sides causes the contracting to be even and regular, so that cracking, &c., are avoided. Moreover, owing to the abnormal compression or concentration of the molten mass during the period of superheating and also to the subsequent enormous force of contraction due to the sudden chilling of its surface the sound-record molded by my process is much denser and harder on the surface than in case of an ordinary record made in the usual manner. It is, so to speak, "case-hardened" or tempered. Further, inasmuch as this symmetrical chilling effect takes place from the exterior of the mold and its casting I have discovered that with the composition at present employed (which is a mixture of two ingredients, as stearic acid and ceresin, both the hardness and the melting-point or solidifying-point of one ingredient being higher than those of the other) the first effect of this sudden exterior chilling is an initial reduction of the temperature to a point below the solidifying-point of the harder ingredient, which is thereupon connected into a thin shell or film, while the softer ingredient (still remaining liquid) is consequently forced inward. The result is as already indicated—viz., a casting whose exterior surface is much harder and denser than its mass, though the gradation is so gradual and imperceptible that there is no line of separation that might cause the outer casing to break off or the inner to shrink away.

Instead of admitting steam after the wax has been poured into the mold it may be admitted simultaneously or beforehand, as the object to be accomplished is the superheating of the molten mass and the maintaining of that heat. It is obvious that other means for superheating the material may be employed.

Among the superior advantages of my case-hardened record so produced are that the mass being denser is less liable to be affected by changes of temperature and moisture and that being harder it is not so readily worn out by the action of a reproducing-stylus. Besides, while it would be difficult to engrave a satisfactory original sound-record upon a surface as hard as that produced by my process, yet by this process a sound-record equally as good as an original record is readily and cheaply produced in a more durable condition.

Of course I do not limit myself either to a cylindrical sound-record or to one of the type characterized by vertical irregularities.

I claim—

1. A sound-record of suitable composition having the surface of the undulatory record case-hardened or tempered, substantially as described.

2. A sound-record of suitable material having its surface case-hardened or tempered and graduating inward into a comparatively softer mass by imperceptible degrees, substantially as described.

3. A molded sound-record of suitable composition having the surface of the undulatory record case-hardened or tempered.

In testimony whereof I have signed my name to this specification in the presence of two subscribing witnesses.

THOMAS H. MACDONALD.

Witnesses:
M. A. FOGO,
A. B. KEOUGH.